Aug. 18, 1970 — J. P. CHERNOCH — 3,525,053
TRANSVERSE MODE DISCRIMINATOR FOR LASER APPARATUS
Filed Oct. 22, 1965 — 2 Sheets-Sheet 1
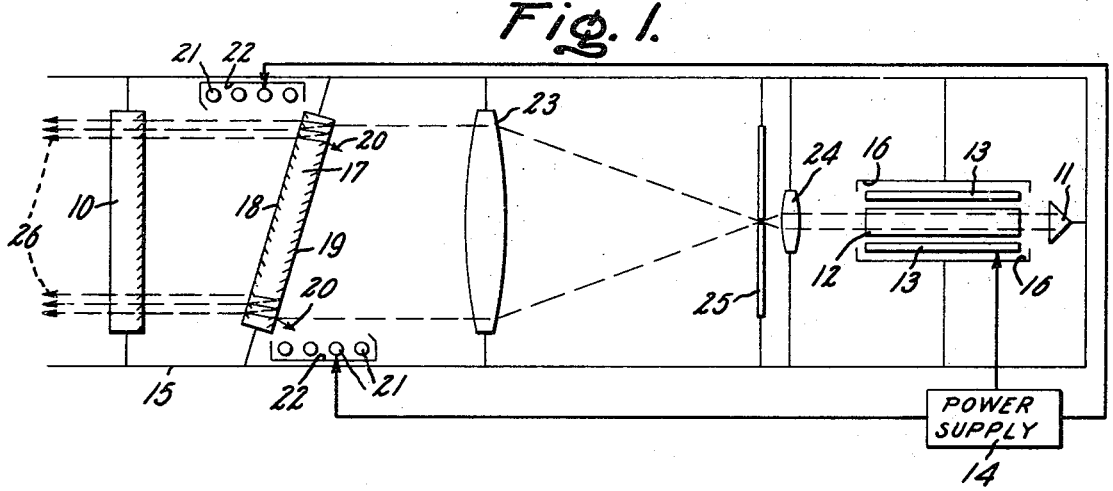
Fig. 1.
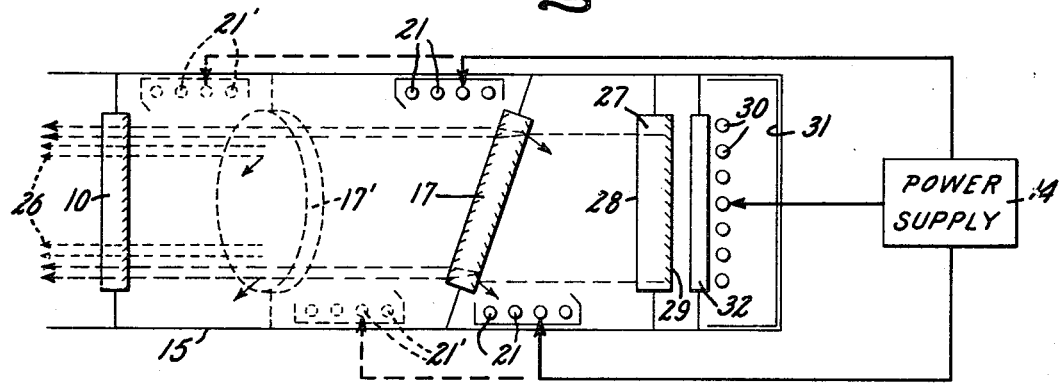
Fig. 2.
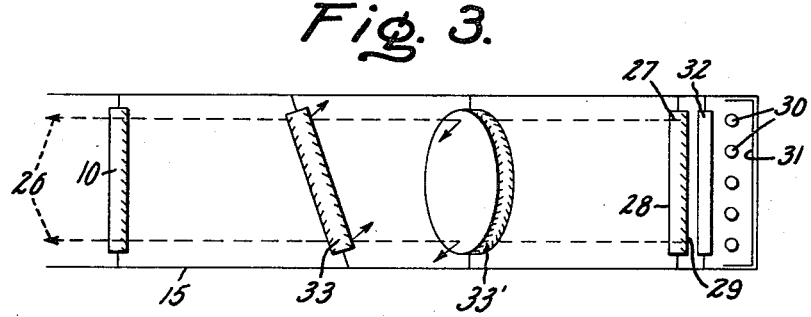
Fig. 3.
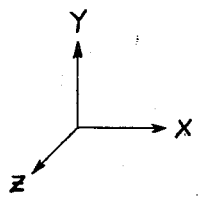
Inventor:
Joseph P. Chernoch,
by Paul A. Frank
His Attorney.

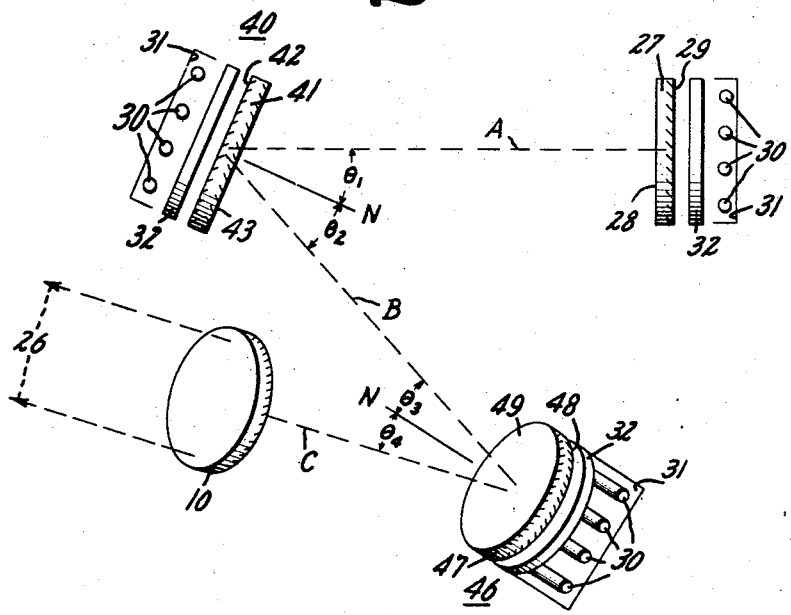
Fig. 4.
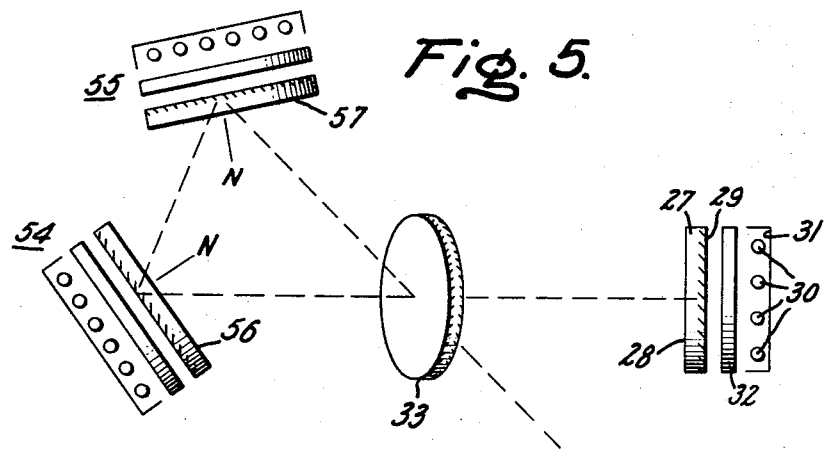
Fig. 5.
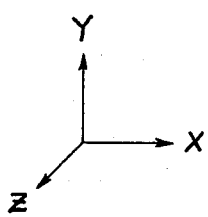
Inventor:
Joseph P. Chernoch,
by 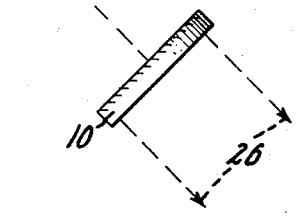
His Attorney.

United States Patent Office 3,525,053
Patented Aug. 18, 1970

3,525,053
**TRANSVERSE MODE DISCRIMINATOR
FOR LASER APPARATUS**
Joseph P. Chernoch, Scotia, N.Y., assignor to General
Electric Company, a corporation of New York
Filed Oct. 22, 1965, Ser. No. 501,091
Int. Cl. H01s 3/00
U.S. Cl. 331—94.5                                    3 Claims

ABSTRACT OF THE DISCLOSURE

The optical reasonant cavity of a laser oscillator includes a means for discriminating against transverse mode frequencies produced in the cavity. The transverse mode discriminator may be a passive etalon angularly positioned in the resonant cavity or an active type etalon which provides both mode discrimination and regenerative amplification. At least one of the elements in the apparatus comprises a laser disk optically pumped through one of of its end surfaces.

My invention relates to a laser oscillator apparatus provided with means for transverse mode discrimination, and in particular, to such apparatus wherein the mode discrimination is obtained by an active or passive tilted etalon in the optical resonant cavity of the laser oscillator.

A recently developed device, now conventionally described as a laser (light amplification by stimulated emission of radiation), has the potential for wide application in many diverse fields such as communication, metallurgy and medicine. The laser is a light source having the radiated output therefrom predominantly in one or more narrow bands of the electromagnetic spectrum. Such output is a narrowly diverging beam of light which is usually in the visible or infrared frequency range of the electromagnetic spectrum. Specific liquids, gases and solid media have been found to exhibit the properties of the laser wherein the laser media releases electromagnetic energy which can be stored in discrete metastable states as a result of being excited or pumped by an electrical or electromagnetic signal of frequency compatible with the particular laser medium. The pumping means excites the laser media into a metastable high energy state whereupon a stimulated emission of monochromatic and directional (coherent) electromagnetic radiation is emitted from the laser media. The stimulated emission is initiated in the laser material by an initial spontaneous emission of electromagnetic radiation which is amplified by multiple reflection within a suitable optical resonant cavity to thereby generate the stimulated emission. The optical resonant cavity may comprise an external cavity formed by external reflectors or suitable reflective coatings on the end surfaces of the laser body to define what may be described as an internal optical resonant cavity. The reflective surfaces (mirrors), whether of the internal or external optical resonant cavity type, are spaced apart an optical length equal to an integral number of half-wave lengths at the optical radiation frequency characteristic of a selected energy level transition of the particular laser medium which generates the stimulated emission of electromagnetic radiation (hereinafter described as the laser beam).

The laser beam is initially generated within a laser oscillator device, such device including an optical resonant cavity wherein one of the cavity defining mirrors is highly (essentially 100%) reflective and the other mirror only partially reflective (and partially transmissive) such that upon the density of excited atoms within the laser medium exceeding the critical value at which stimulated emission exceeds fluorescent radiation and other losses, a laser beam is emitted from the cavity, passing through the partially transmissive mirror.

A problem inherent in laser oscillators in the generation of transverse mode frequencies which produce the often undesired effect of laser beam divergence. The transverse modes are generated in the optical resonant cavity of the oscillator and are dependent upon (1) the optical length between the mirrors defining the cavity, (2) the angle of laser beam propagation, and (3) the wavelength (frequency) of laser radiation.

Therefore, a principal object of my invention is to provide a mode discrimination laser oscillator.

Many applications require energy outputs which are higher than that obtained from the laser oscillator alone, and for such cases a laser amplifier is conventionally optically coupled to the output of the oscillator. A problem inherent in the coupling of the oscillator to a regenerative laser amplifier is the mismatch between the resonant (Eigen) frequencies of the regenerative amplifier and the Eigen frequencies of the input signal thereto as generated by the oscillator. In the case of solid laser material the mismatch prevents full utilization of the energy stored in the relatively broad line width of typical laser glasses thereby resulting in output laser beams having lower energy outputs, and in the extreme case can result in no output.

Therefore, another object of my invention is to provide a laser oscillator-amplifier device having reduced mismatch effects between the laser oscillator and amplifier.

The solid laser material provides the highest energy output as compared to the liquid and gas lasers and conventionally has been employed in rod form wherein a relatively long cylindrical body of laser material has a pair of opposed relatively small end surfaces. The laser rod is optically pumped through the side surface and the laser beam is emitted through one or both end surfaces thereof. Recently, a body of solid laser material in disk-shaped form has been developed to provide the highest energy output due to the more efficient optical pumping effected through the relatively large end surfaces thereof. The laser disk devices are described in copending U.S. patent applications S.N. 315,054, entitled "Directly Pumped Laser," inventor Joseph P. Chernoch, filed Oct. 9, 1963 and S.N. 467,941, entitled "Laser Device," inventors Kiyo Tomiyasu and Joseph C. Almasi, filed June 29, 1965, both assigned to the assignee of the present invention. Each of these copending patent applications disclose disk-shaped bodies of solid laser material which may be optically pumped through one end surface thereof but are preferably pumped through both end surfaces and the laser beam passes through both such end surfaces.

A further object of my invention is to provide a mode discrimination laser system employing a disk-shaped laser device whereby laser beams having high energy outputs may be obtained.

Briefly stated, my invention provides a laser oscillator device wherein the optical resonant cavity includes therein at least one angularly positioned etalon such that its normal axis is tilted (inclined) slightly from the axis of the cavity. The etalon may be of the passive type (two spaced, plane, parallel, partially reflecting surfaces) or the active type (laser material in reflection coated disk-shaped form). The tilted etalon(s) discriminates against transverse mode frequencies which are, in general, inherently generated in the optical resonant cavity. The active type etalon provides both mode discrimination and regenerative amplification. Two etalons may be positiond in the cavity, the normal axes thereof tilted with respect to the cavity axis in planes which are orthogonal to each other to maximize the mode discrimination effect. The etalons may be used in an on-axis oscillator configuration wherein the two mirrors defining the cavity are in optical and physical alignment (i.e., coaxial), and in an off-axis configuration wherein the cavity defining (100% reflective and partially transmissive) mirrors are merely in optical alignment (i.e., noncoaxial). The particular cavity-defining mirror having substantially 100% reflectivity may comprise a laser disk having a first of the two opposed end surfaces thereof coated to provide the desired 100% reflectivity at the laser energy wavelength for the particular laser material. This laser disk is optically pumped through the 100% reflective end surface, and upon several reflections within the cavity, a laser beam is emitted from the cavity through the cavity-defining mirror which is partially transmissive.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein:

FIG. 1 is a diagrammatic view of a first embodiment of an on-axis mode discrimination laser oscillator constructed in accordance with my invention;

FIG. 2 is a diagrammatic view of a second embodiment of the on-axis mode discrimination oscillator;

FIG. 3 is a diagrammatic view of a third embodiment of the on-axis mode discrimination oscillator;

FIG. 4 is a diagrammatic view of a first embodiment of an off-axis mode discrimination laser oscillator; and FIG. 5 is a diagrammatic view of a second embodiment of an off-axis mode discrimination oscillator.

Referring now to FIG. 1, there is shown a first embodiment of a mode discrimination laser oscillator of the on-axis type. The oscillator includes the conventional laser oscillator components of an optical resonant cavity and laser rod positioned therein. The cavity is defined by two external reflectors (mirrors) which in the particular embodiment of FIG. 1, are in both optical and physical alignment, that is, are coaxial. The two particular mirrors illustrated are a rigidly supported partially transmissive, partially reflective, plane mirror 10 and a Q-switch 11 which intermittently provides a substantially totally reflective surface at the laser energy wavelength for the particular laser material employed. It is to be understood that mirror 11 could also be a static device such as a rigidly supported totally reflective plane mirror. Interposed between mirrors 10, 11 is a laser rod 12 having its side surfaces optically pumped by a plurality of electric lamps 13 in direct optical communication therewith. Lamps 13 are illustrated as being straight lamps although helical lamps, and lamps of other configurations may also be employed. The lamps 13 have a radiation output preferably in a narrow and desired spectral range and may be of the flash type for pulsed laser operation and of the constant light output type for a continuously operating laser. A suitable source of electrical energy 14 (shown only in FIGS. 1 and 2 for simplification) is connected to the terminal ends of the optical pumping lamps 13. In the case of flash lamps, a conventional high voltage electronic trigger circuit may be employed to initiate the gaseous discharge within such flash lamps. External reflectors 10, 11, laser rod 12 and the pumping lamps 13 are supported within a housing 15 with the necessary rigidity to maintain alignment of the external reflectors with the laser rod. Housing 15 may be of metal and located therein and adjacent to lamps 13 is a highly reflective surface 16 such as polished aluminum to increase the efficiency of the laser pumping. The elements of the laser oscillator heretofore described comprise a conventional rod-type laser oscillator wherein a laser beam that may be generated within the optical resonant cavity is emitted therefrom through partially transmissive mirror 10.

My invention includes the addition of a second body of laser material within the optical resonant cavity. The second body of laser material consists of a relatively short cylindrical body 17 having a pair of opposed, relatively large, parallel, planar end surfaces 18 and 19. I define a "relatively short" body having "relatively large" end surfaces as one in which a diameter dimension exceeds the longitudinal dimension. As herein employed "cylindrical" is defined as the surface traced by any straight line moving parallel to a fixed straight line. Thus, the cross section of the laser body may be circular, elliptical, square or any other suitable shape as desired. The geometry is preferably such that a diameter of the laser body is considerably greater than the length thereof and thus forms a disk-like member. End surfaces 18, 19 are coated to provide selected equal or unequal reflectivities in the range of 4–90% at the laser energy radiation wavelength characteristic of the particular laser material employed. The reflective coatings may be of the well-known multi-layer dielectric type and are highly transmissive at the optical pumping radiation wavelengths. The (cylindrical) side surfaces of the laser disk, in all of the embodiments herein described, are preferably coated to provide a highly absorbing surface at the laser energy wavelength and thereby prevent internal reflections from such side surfaces. The normal axis of laser disk 17 is tilted or inclined slightly from the axis of the cavity (as defined by the coaxial normal axes of mirrors 10, 11). The angular tilt is dependent upon the optical resonant cavity dimensions (length and diameter), and is usually in the range of 0.05 to 10 degrees. Thus, in the case whereas in the shorter cavity, and especially in the case where the diameter is large, the tilt is relatively great. The use of the reflective coating on laser disk end surfaces 18, 19 and the tilting of the laser disk accomplishes a tuning of the laser disk to obtain resonance thereof at the laser frequency (wavelength λ). This tuning develops a high radiation density within the laser disk (as illustrated by the multiple reflections between the end surfaces), resulting in a higher stimulation probability and corresponding higher gain. The gain of such laser disk is:

$$\text{GAIN} = \frac{(1-R)^2 e^{\sigma N}}{(1-Re^{\sigma N})^2} \qquad (1)$$

where $R$=disk end surface reflectivity (for equal reflectivities) and $\sqrt{R_1 R_2}$ (for unequal reflectivities)
$\sigma$=stimulation cross section in square centimeters (cm.²)
$N$=population inversion per cm.² of disk end surface area It is apparent from Equation 1 that for $R=0$ there is obtained a traveling wave amplifier having no feedback and a gain of $e^{\sigma N}$; for $$R = \frac{1}{e^{\sigma N}}$$

the gain is infinity and an oscillator is obtained; and intermediate values of R provide a regenerative amplifier having a value of gain as desired.

A problem inherent in achieving a regenerative laser amplifier structure is the mechanical tolerances (thickness and flatness) required to maintain the laser disk in tune with the input (unamplified) laser signal. This situation is further complicated by the requirement that to fully utilize the energy stored in the relatively broad line width of typical laser glasses, the tuned laser disk amplifier must be a multiple frequency ampifier spanning the entire fluorescent line width of the laser material being used. Since the laser disk is especially suitable for high energy output applications, the latter requirement is of considerable importance.

The multiple frequency requirement is satisfied in that the tilted, reflective laser disk is basically a device known in optics technology as a Fabry-Perot etalon which exhibits a transmission peak (i.e. is in tune) for every wavelength λ satisfying the relationship:

$$\lambda = \frac{2Ln \cos \phi}{m} \qquad (2)$$

where

L=length of the cavity (or thickness of etalon)

$n$ = index of refraction of medium between the two reflecting surfaces (of cavity or etalon)
$\phi$ = angle of refraction in the medium
$m$ = positive integer The spacing of the transmission peaks is:

$$\Delta\lambda = \frac{\lambda^2}{2Ln \cos \phi} \qquad (3)$$

As an example, for a laser disk 1 cm. thickness of a material having an index refraction $n=1.5$, the transmission peaks occur every ⅓ angstrom (A.) at a wavelength $\lambda$ centered at 1 micron.

The use of the tuned (regenerative) laser disk amplifier 17 in the optical resonant) oscillator cavity permits the oscillator portion thereof to lock-on and track the tuned laser disk amplifier. The tuned laser disk acts as a "comb" frequency filter permitting laser action in the oscillator cavity to occur only at those waelength that match the transmission peaks of the laser disk. The (transverse mode) frequencies not matching the disk characteristics are reflected out of the oscillator cavity due to the tilting of the disk axis with respect to the cavity axis. Such mismatched frequencies are indicated by the arrows 20. The oscillator cavity is taken to be along the X-coordinate axis, and since the normal axis of disk 17 is illustrated as being tilted from the cavity axis in the X-Y plane, the tuned amplifier 17 is effective in discriminating against the transverse mode frequencies in the vertical plane.

The ability of the oscillator to track the laser disk amplifier requires that the oscillator cavity be capable of sustaining modes at some or all of the laser disk frequencies. One way of accomplishing this is by having the oscillator cavity appreciably longer than the laser disk thickness. As a result, the mode spacing in the oscillator cavity is a fraction of the separation between the laser disk transmission peaks. This fraction is equal to the ratio of laser disk thickness to oscillator cavity length. Thus, for example, a laser disk thickness of 1 cm. and oscillator cavity length of 100 cm. results in laser disk transmission peaks every ⅓ A. at a wavelength centered at 1 micron while the oscillator modes occur every ⅟₃₀₀ A. thereby insuring that at all times some oscillator mode coincides with the transmission peaks of the laser disk amplifier. The oscillator is thus matched to the tilted laser disk amplifier and operates at those frequencies that match the laser disk amplifier characteristics. This matched condition between oscillator and regenerative amplifier provides a maximum transfer of laser energy to the amplifier.

The laser material within laser disk 17 is optically pumped through end surfaces 18 and 19 by a plurality of electric lamps 21 which are supported within housing 15 and are preferably in direct optical communication with the disk end surfaces. A highly reflective surface 22 such as polished aluminum is preferably employed within housing 15 adjacent lamps 21 to increase the efficiency of the laser pumping. The ability to optically pump the laser material through the much greater area of the end surfaces of the laser disk and thus excite a much greater volume of laser material into a high energy metastable state results in the emission of a high energy laser beam therefrom. One of the advantages of the laser disk is the distribution of the laser energy over the wide area of the end surfaces such that the energy density is maintained below the level which may damage the laser disk. To utilize the large area of the laser disk end surfaces, and since the laser rod 12 emits a laser beam of small cross section, a series of lenses 23, 24 are employed to transform the narrow parallel beam output of the laser rod to a wider parallel beam as an input to the laser disk. An optical mode selector such as a pin hole mode selector 25 may be employed at the focussed point of the laser beam to further reduce undesired transverse modes. The amplified output laser beam (indicated by arrows 26) which is transmitted through output mirror 10 thus is relatively free of the undesired transverse modes in the vertical (X-Y) plane.

Suitable selective radiation filters are preferably, though not necessarily, interposed between all of the bodies of laser material and associated pumping means therefor in the FIGS. 1-5 embodiments to filter out the spectrum of the lamp radiation which is not useful for pumping the laser material and thereby reduce the heating thereof. Alternatively, or in addition, cooling means such as forced air or other fluid coolants may also be employed.

A second embodiment of a mode discrimination laser oscillator is illustrated in FIG. 2 which is similar to the embodiment of FIG. 1 with the exception that the laser rod, external reflector 11, and means for transforming the narrow laser beam output thereof into a wider beam are replaced by a second laser disk 27 supported within housing 15 coaxially with partially transmissive plane mirror 10. A third copending patent application S.N. 491,921 entitled "Laser Device," inventor Joseph P. Chernoch, filed Oct. 1, 1965, and assigned to the assignee of the present invention, describes a laser disk device of the type employed in FIG. 2 wherein the laser disk 27 is optically pumped through a first end surface 29 thereof and emits the laser radiation through the second end surface 28. As is more fully described in the latter copending application, end surface 29 of laser disk 27 is coated to provide substantially 100% reflectivity at the laser energy wavelength for the particular laser material being employed, and is highly transmissive at the optical pumping radiation wavelengths which excite the laser material into a metastable high energy level. Laser disk 27 may thus be described as an "active mirror" laser device and the 100% reflective end surface 29 defines one end of the laser oscillator optical resonant cavity. The other end of the cavity is defined by partially transmissive output mirror 10. End surface 28 of laser disk 27 may be antireflection coated to reduce the inherent interface reflection loss at the air-dielectric interface of such (uncoated) end surface. The distance between external reflector 10 and reflective end surface 29 is an optical length equal to an integral number of halfwavelengths at the laser electromagnetic radiation frequency as in the case of the spacing between external reflectors 10 and 11 in FIG. 1.

The most efficient means for optically pumping the laser material of laser disk 27 comprises at least one lamp and, in general, a bank or plurality of lamps 30 in a planar arrangement parallel to end surface 29 and in direct optical communication therewith. The lamps 30 are of the same type as lamps 21 since the laser material employed in laser disks 17 and 27 is identical, although the power rating of the lamps may be different. The "active mirror" end portion of housing 15 is provided with a highly reflective surface 31 to increase the efficiency of the laser disk 27 pumping through end surface 29. The lamp bank 30 is mounted in close proximity to the disk to further increase the efficiency of the pumping. A suitable selective radiation filter 32 is preferably, though not necessarily, interposed between laser disk end surface 29 and the pumping means 30 to filter out the spectrum of the lamp radiation which is not useful for pumping the laser disk. It is to be understood that such filter may also be interposed between lamps 21 and the end surfaces of laser disk 17 (in all of the FIGS. 1-5 embodiments) for the same purpose. The mode discrimination laser oscillator of FIG. 2 operates in a similar manner to that illustrated in FIG. 1 in that laser disk 17 functions as a regenerative amplifier and transverse mode discriminator in the vertical plane, the apparatus of FIG. 2 suitable for providing a higher energy output laser beam 26 due to the higher energy capabilities of the laser disk oscillator as compared to the laser rod. A second tilted laser disk 17' and pumping means 21' therefore (illustrated in dashed line form) may be positioned within the resonant cavity, the disk being tilted in a plane orthogonal to that of disk 17, that is, the normal axis of disk 17' is tilted from the cavity axis in the X–Z plane. The magnitudes of the angles of inclination of disks 17 and 17' in the X–Y and Y–Z planes, respectively, are, in general, equal. The tuned amplifier 17' is thus effective in discriminating against the transverse modes in the horizontal plane. Disk 17' is identical with disk 17 as to construction and reflective coatings on the end surfaces thereof.

A third embodiment of an on-axis mode discrimination laser oscillator is illustrated in FIG. 3 which is similar to the embodiment of FIG. 2 with the exception that the two active tilted etalons 17, 17' (the mode discrimination laser disk regenerative amplifiers) are replaced by two passive tilted etalons 33, 33'. The passive etalon is comprised of two spaced, plane, parallel, partially reflecting surfaces, and as one example may be a glass plate having plane surfaces, coated with partially transmissive films of equal or unequal reflectivity at the laser energy wavelength. The reflectivities are not, an general, the same as the reflectivities employed with the active etalons. The normal axis of etalon 33 is tilted slightly from the cavity axis in the X–Y plane and is thus effective in discriminating against the transverse mode frequencies in the vertcial plane. In like manner, the normal axis of etalon 33' is tilted from the cavity axis in the X–Z plane and is thus effective in discriminating against the transverse modes in the horizontal plane.

The use of two etalons (active or passive), tilted in planes orthogonal to each other, insures that all of the transverse modes are substantially eliminated in the output laser beam 26, and thus any divergence in such laser beam is minimized. The use of active etalons further provides two stages of laser energy amplification and such tuned regenerative amplifier are matched to the laser oscillator to obtain maximum transfer of the laser energy to the output beam.

The on-axis type of mode discrimination laser oscillators described with reference to FIGS. 1–3 may be converted to the off-axis type by the addition of one or more suitable mirrors which are angularly positioned with respect to the axis of the laser beam upon its emission from the oscillator laser disk (or rod).

A first embodiment of an off-axis mode discrimination laser disk oscillator which also minimizes the number of critical optical elements is illustrated in diagrammatic form in FIG. 4. The outlines of a housing and the power supply for the optical pumping lamps are omitted in FIGS. 4 and 5 for the sake of simplicity, it being understood that such elements are employed in the actual apparatus. Referring in particular to FIG. 4, there is shown a 3-disk laser oscillator using two regenerative "active mirrors" as tilted etalons to provide discrimination against transverse modes in both the horizontal and vertical planes, and also provide two stages of laser energy amplification. The optical resonant cavity is defined by the same elements as in FIGS. 2, 3 and 5, the distinction being that in FIGS. 2 and 3 these elements are in both optical and physical alignment (coaxial), whereas in FIGS. 4 and 5 they are merely in optical alignment (and noncoaxial). Thus, in FIG. 4, the cavity is defined by a first active mirror comprising disk 27 and a partially transmissive plane mirror 10. Disk 27 is coated at end surface 29 in the same manner as in FIGS. 2 and 3, to provide 100% reflectivity at the laser energy wavelength and be highly transmissive at the optical pumping radiation wavelengths, and end surface 28 is antireflection coated. The laser material of laser disk 27 is optically pumped through end surface 29 by means of lamps 30, a selective radiation filter 32 being interposed therebetween as described with reference to FIG. 2.

A second active mirror designated as a whole by numeral 40 is in direct optical communication with disk 27 and comprises a laser disk 41 having its normal axis (N) inclined slightly from the normal (X coordinate) axis of laser disk 27 in the X–Y plane. End surface 42 of laser disk 41 is coated in the manner of surface 29 of laser disk 27 at the laser energy wavelength and is highly transmissive at the optical pumping radiation wavelengths. However, opposed end surface 43 is coated to provide a reflectivity in the range of 4 to 90% at the laser energy wavelength and is thus partially transmissive. The two unequally reflective end surfaces of laser disk 41 thereby form a regenerative laser amplifier similar to laser disk 17 in FIG. 2, but in an active mirror configuration. The slight inclination $\theta_1$ of disk 41's normal axis with respect to the normal axis of the disk 27 in the X–Y plane provides the desired transverse mode discrimination in the vertical plane as well as directing (reflecting) the laser beam along the cavity axis at the conjugate angle $\theta_2$ from the normal in the direction of laser disk 47. A bank of optical pumping lamps 30 are supported in a plane parallel to end surface 42 for optically pumping the laser material therethrough. A selective radiation filter 32 is preferably interposed between the optical pumping means 30 and end surface 42 for filtering out the spectrum of the lamp radiation which is not useful for pumping the laser disk. Reflective surface 31 increases the efficiency of the optical pumping.

A third active mirror 46 is positioned within the optical resonant cavity defined by laser disk 27 and output mirror 10. The optical cavity axis is defined by dashed lines, A, B and C. Lines A and B determine the plane of incidence (and reflection) and contain the normal N of disk 41. In like manner, lines B and C determine the plane of incidence (and reflection) and contain the normal N of disk 47. The angle between B and C is of the same order as the angle between A and B. Planes A–B and B–C are perpendicular to each other to provide the transverse mode discrimination in both the vertical and horizontal directions. Active mirror 46 is of the same type as active mirror 40 in that end surface 48 is coated to provide substantially 100% reflectivity, opposed end surface 49 is coated to provide reflectivity in the order of 4 to 90%, and the laser material is optically pumped through end surface 48 by means of lamps 30 and selective radiation filter 32. The optical resonant cavity is completed by partially transmissive plane mirror 10, the normal of which is coincident with line C. It may be seen that the embodiment of FIG. 4 provides two stages of regenerative laser amplification comprising active mirrors 40 and 46 which also provide transverse mode discrimination in both planes and thus may be described as active etalons.

A second embodiment of an off-axis transverse mode discrimination laser oscillator is shown in FIG. 5 wherein a single passive etalon is positioned within the optical resonant cavity to obtain two-plane mode discrimination. In particular, the optical resonant cavity is defined by a first active mirror including laser disk 27 which is of similar construction as in FIGS. 2, 3 and 4, and by a partially transmissive plane mirror 10. The normal axis of a single passive etalon 33 of the type described with reference to FIG. 3 is inclined slightly from the normal axis of disk 27 in the X–Z plane to provide transverse mode discrimination in the horizontal plane. The optical resonant cavity axis which intersects the tilted etalon 33 in one (the X–Z) plane is then directed by means of two active mirrors 54 and 55 to intersect tilted etalon 33 in a second plane orthogonal to the first, i.e., the X–Y plane (relative to the normal to mirror 10) to provide transverse mode discrimination in the vertical plane. Active mirrors 54, 55 differ from (regenerative) active mirrors 40 and 46 in FIG. 4 in that the end surfaces 56 and 57 of active mirrors 54 and 55, respectively, are merely antireflection coated as distinguished from the partial reflective coating of the regenerative active mirrors. The disk end surfaces opposed to surfaces 56, 57 are, however, 100% reflection coated as in the case of regenerative active mirrors 40, 46. Finally, active mirrors 54, 55 are positioned with respect to etalon 33 such that the optical resonant cavity axis intersects etalon 33 to obtain the prescribed angles of tilt hereinabove described. For this reason, the conjugate angles formed at each disk by the two cavity axis lines and disk normal are not necessarily within the small range (0.05 to 10 degrees) as in FIG. 4, but are dependent on the relative positions of mirrors 54, 55, with respect to etalon 33. The orientation of the elements of FIG. 5 has the advantage of requiring only one etalon for obtaining transverse mode discrimination in both planes and thereby eliminates the optical frequency matching problem inherent when utilizing two etalons. The use of the two active mirrors 54, 55 for directing the optical resonant cavity axis also increases the laser energy output of the system, since these mirrors are (nonregenerative) laser amplifiers, without appreciably changing the alignment stability of the system.

A typical example of an active mirror laser disk apparatus consists of the following elements. The disk is a neodymium activated laser glass of circular cross section measuring 6 inches in diameter by 1 inch in thickness. The 100% reflectivity (at the $1.06\mu$ wavelength for neodymium) coated end surface of the disk is optically pumped by a bank of six 6½″ long by 15 mm. diameter, 10,000 joule xenon flash lamps which are spaced 1½ inches from the disk surface. The selective radiation filter is comprised of a plate of ultraviolet absorbing glass enclosing a one cm. thickness of water and transmits only the useful pump radiation between 4,000 and 10,000 A. wavelength.

From the foregoing description, it is apparent that my invention attains the objectives set forth and makes available an improved transverse mode discrimination laser oscillator employing disk-shaped bodies of laser material for producing laser beams having high energy outputs and minimum beam divergence. The mode discrimination may be obtained with the use of tilted active or passive etalons which are positioned along the axis of the optical resonant cavity of the oscillator. The use of active etalons also provides laser amplifications without the attendant mismatch effects generally obtained when a separate regenerative laser amplifier is optically coupled to the output of a laser oscillator. The mode discrimination laser oscillator may be of the on-axis type or the off-axis type. Since the energy output of a laser device is directly proportional to the volume of laser material, and a disk-shaped laser having an end surface area of many square inches may readily be manufactured, it is apparent that much greater volume of laser material may be optically pumped and thereby provide an extremely high level of laser energy in the form of a coherent beam of electro-magnetic radiation. The laser disk is not volume limited as in the case of the long rod-type laser.

Having described three embodiments of an on-axis mode discrimination laser oscillator and two embodiments of an off-axis mode discrimination laser oscillator, it is believed obvious that modification and variation of my invention is possible in the light of the above teachings. Thus, the off-axis mode oscillator may have the various active and passive (if employed) elements positioned in orientations other than that illustrated in FIGS. 4 and 5. Various shapes of the housing enclosing the laser disk(s) and pumping means and various shapes of the laser disk and pumping lamps may readily be employed, the particular embodiments illustrated not to be considered a limitation thereof. Further, cooling means for the lamps, controlled atmospheres, selective radiation filters (separate or integral with the lamp glass envelope) and separate reflector members for individual lamps may also be employed singly or in combination in the various illustrated embodiments. For continuous laser operation, cooling of both the disk(s) and the lamps is necessary.

My invention is not limited to neodymium as the laser material but is intended to include all solid laser materials in the disk form such as the well-known ruby, for example. It is, of course, necessary that the same laser material be used in all of the components of any one laser oscillator-amplifier system. In the case of a laser rod as the laser generator, the cavity defining 100% reflective surface may be one end of the rod. Finally, the end surfaces of the laser disk need not be perfectly parallel to each other (but merely substantially parallel) in the cases wherein only one end surface is reflection coated. It is, therefore, to be understood that changes may be made in the particular embodiments of my invention described which are within the full intended scope of the invention as defined by the following claims.

What I claim as new and desire to secure by Letters Patent of the United States is:

1. A mode discrimination laser oscillator comprising
   an optical resonant cavity defined by a first end surface having a reflectivity of substantially 100% at a laser radiation wavelength characteristic of a laser material positioned within the cavity, and a second end surface partially transmissive and partially reflective at the laser radiation wavelength, said first and second end surfaces in optical alignment,
   means positioned in said cavity for generating a beam of laser radiation therein, the laser beam being emitted from said cavity through said second end surface,
   means positioned in said cavity for discriminating against tranvserse mode frequencies in the laser beam to thereby minimize divergence of the beam and also for providing amplification of the energy in the laser beam, said mode discrimination means comprising
      at least one active etalon having the normal axis thereof inclined slightly from the axis of said cavity in a selected plane whereby said etalon discriminates against the transverse mode frequencies in said selected plane, said active etalon comprising
      a relatively short cylindrical body of laser material having a pair of opposed, relatively large, planar end surfaces and a diameter dimension greater than the longitudinal dimension, the cylindrical side surfaces thereof coated to provide a highly absorbing surface at the laser radiation wavelength to prevent internal reflections from the side surfaces, and
      means for optically pumping the body of laser material through at least one end surface thereof whereby said active etalon also provides amplification of the energy in the laser beam, the cavity axis defined by said first end surface is angularly reflected from said mode discrimination means to said second end surface whereby said mode discrimination means is positioned in only optical alignment with the cavity defining end surfaces to form an off-axis configuration oscillator.

2. A mode discrimination laser oscillator comprising
   a first relatively short cylindrical body of laser material having a pair of opposed, relatively large, planar end surfaces and a diameter dimension greater than the longitudinal dimension, a first of said planar end surfaces coated to provide a reflectivity of substantially 100% at a laser radiation wavelength characteristic of the laser material to thereby define a first end of an optical resonant cavity, the cylindrical side surfaces thereof coated to provide a highly absorbing surface at the laser radiation wavelength to prevent internal reflections from the side surfaces,
   means for optically pumping said body of laser material through said first end surface whereby said body subsequently emits a beam of laser radiation through a second of said planar end surfaces, a partially transmissive external reflector means in optical alignment with said body of laser material and spaced therefrom for defining a second end of the optical resonant cavity of a laser oscillator, the first and second ends of said optical resonant cavity are only in optical alignment to form an off-axis configuration oscillator, said optical resonant cavity further comprising a second and third relatively short cylindrical body of laser material, each said second and third body of laser material having a pair of opposed, relatively large, planar end surfaces, a first of said planar end surfaces thereof coated to provide a reflectivity of substantially 100% at the laser radiation wavelength, a second of said planar end surfaces being antireflection coated, and means positioned in said cavity for discriminating against transverse mode frequencies in the laser beam to thereby minimize divergence of the beam, said mode discrimination means comprising a single passive etalon having the normal axis thereof inclined slightly from the normal axis of said first body of laser material in a first selected plane, said passive etalon comprising a pair of spaced, plane, parallel surfaces coated with partially transmissive films of predetermined reflectivities at the laser radiation wavelength, said second and third bodies of laser material oriented with respect to said etalon whereby the cavity axis is angularly reflected from the 100% reflective surface of said second body of laser material to said 100% reflective surface of said third body of laser material and then directed to intersect said etalon in a second plane orthogonal to the first plane to provide transverse mode discrimination in both planes, and means for optically pumping said second and third bodies of laser material through said first end surfaces thereof whereby said second and third bodies of laser material provide two stages of nonregenerative laser amplification.

3. A mode discrimination laser oscillator comprising a first relatively short cylindrical body of laser material having a pair of opposed, relatively large, planar end surfaces and a diameter dimension greater than the longitudinal dimension, a first of said planar end surfaces coated to provide a reflectivity of substantially 100% at a laser radiation wavelength characteristic of the laser material to thereby define a first end of an optical resonant cavity, the cylindrical side surfaces thereof coated to provide a highly absorbing surface at the laser radiation wavelength to prevent internal reflections from the side surfaces, means for optically pumping said body of laser material through said first end surface whereby said body subsequently emits a beam of laser radiation through a second of said planar end surfaces, a partially transmissive external reflector means in optical alignment with said body of laser material and spaced therefrom for defining a second end of the optical resonant cavity of a laser oscillator, the first and second ends of said optical resonant cavity are in only optical alignment to form an off-axis configuration oscillator, and means positioned in said cavity for discriminating against transverse mode frequencies in the laster beam to thereby minimize divergence of the beam, said mode discrimination means comprise a second relatively short cylindrical body of laser material having a pair of opposed, relatively large, planar end surfaces, the normal axis of said second laser body inclined slightly from the axis of said cavity in a first selected plane, means for optically pumping said second laser body through only one end surface thereof, a third relatively short cylindrical body of laser material having a pair of opposed, relatively large, planar end surfaces, the normal axis of said third laser body inclined slightly from the axis of said cavity in a second selected plane orthogonal to the first plane whereby said second and third laser bodies discriminate against the transverse mode frequencies in both the horizontal and vertical planes, means for optically pumping said third laser body through only one end surface thereof, said second and third bodies of laser material each having a first end surface thereof coated to provide a reflectivity of substantially 100% at the laser radiation wavelength, said second and third bodies of laser material each having a second end surface thereof coated to provide a reflectivity in the range 4 to 90% to produce regenerative amplification of the energy in the laser beam, and said second and third bodies of laser material oriented with respect to the first and second ends of said cavity whereby the cavity axis is reflected from the 100% reflective surface of said second body of laser material to the 100% reflective surface of said third body of laser material and then directed to said second end of the cavity to provide the slight inclinations of the normal axes of said second and third bodies of laser material from the cavity axis.

References Cited

UNITED STATES PATENTS

| | | | |
|---|---|---|---|
| 3,215,949 | 11/1965 | Garrett | 331—94.5 |
| 3,311,846 | 3/1967 | Simpson et al. | 331—94.5 |
| 3,354,404 | 11/1967 | Boyle et al. | 331—94.5 |
| 3,358,243 | 12/1967 | Collins et al. | 331—94.5 |
| 3,423,691 | 1/1969 | Chernoch et al. | 331—94.5 |

OTHER REFERENCES

"Amplification by Reflection From an Active Interferometer," applied physics letters, July 1, 1965, Smiley et al. pp. 1, 2.

RONALD L. WIBERT, Primary Examiner

V. P. McGRAW, Assistant Examiner

U.S. Cl. X.R.

330—4.3